(12) United States Patent
Wayman

(10) Patent No.: US 8,382,140 B2
(45) Date of Patent: Feb. 26, 2013

(54) RECONFIGURABLE WHEELED CYCLE

(76) Inventor: Anthony John Wayman, West Bridgford (GB)

( * ) Notice: Subject to any disclaimer, the term of this patent is extended or adjusted under 35 U.S.C. 154(b) by 0 days.

(21) Appl. No.: 12/951,564

(22) Filed: Nov. 22, 2010

(65) Prior Publication Data
US 2012/0126507 A1 May 24, 2012

(51) Int. Cl.
*B62H 7/00* (2006.01)
*B62K 17/00* (2006.01)
(52) U.S. Cl. ......... 280/295; 280/7.1; 280/7.15; 280/267
(58) Field of Classification Search ............... 280/7.15, 280/7.1, 267, 200, 295
See application file for complete search history.

(56) References Cited

U.S. PATENT DOCUMENTS

| | | | |
|---|---|---|---|
| 2,209,058 A | 7/1940 | Johnson | |
| 2,212,741 A | 8/1940 | Johnson | |
| 2,451,665 A | 10/1948 | Di Bartolomeo | |
| 2,458,127 A | 1/1949 | Ahrens | |
| 3,827,705 A | 8/1974 | Templeton | |
| 3,836,177 A | 9/1974 | Heidt | |
| 5,556,116 A | 9/1996 | Sloss et al. | |
| 7,988,168 B2 * | 8/2011 | Miroewski | 280/200 |
| 2007/0052199 A1 | 3/2007 | Schulte et al. | |

FOREIGN PATENT DOCUMENTS
JP 2001278157 A 10/2001

OTHER PUBLICATIONS

British Search Report dated Jan. 8, 2010 from Application No. GB0921901.5.

* cited by examiner

*Primary Examiner* — Tony Winner
(74) *Attorney, Agent, or Firm* — Young Basile

(57) ABSTRACT

A cycle comprises a frame, a front fork and a rear fork. The cycle is convertible between a bicycle, a tricycle and a quad-cycle by replacement of wheels.

9 Claims, 6 Drawing Sheets

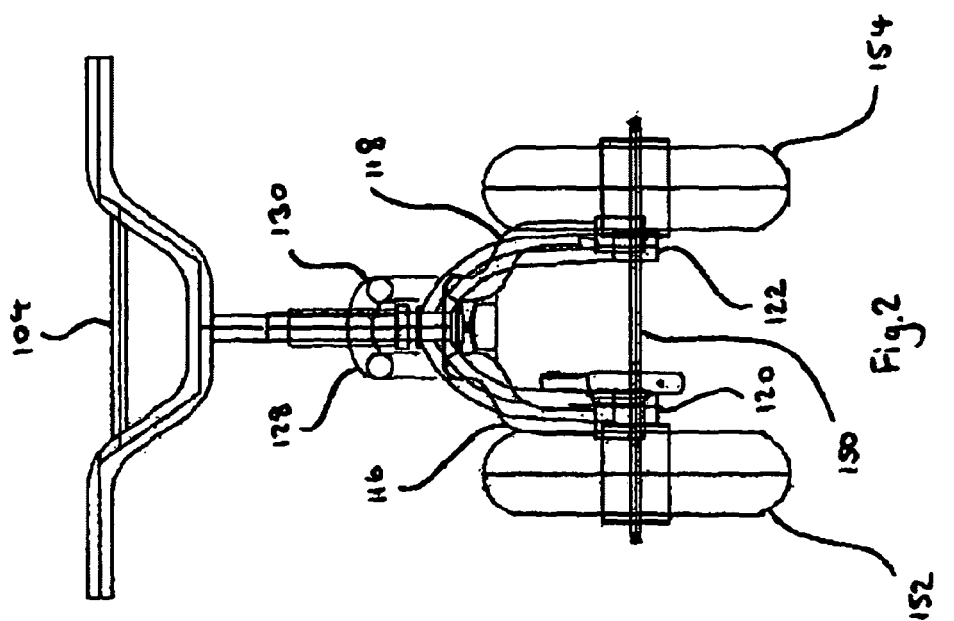
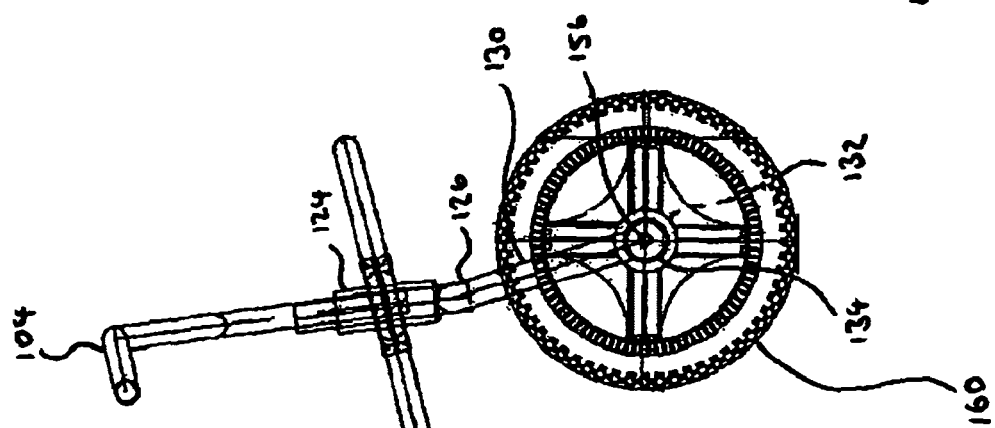
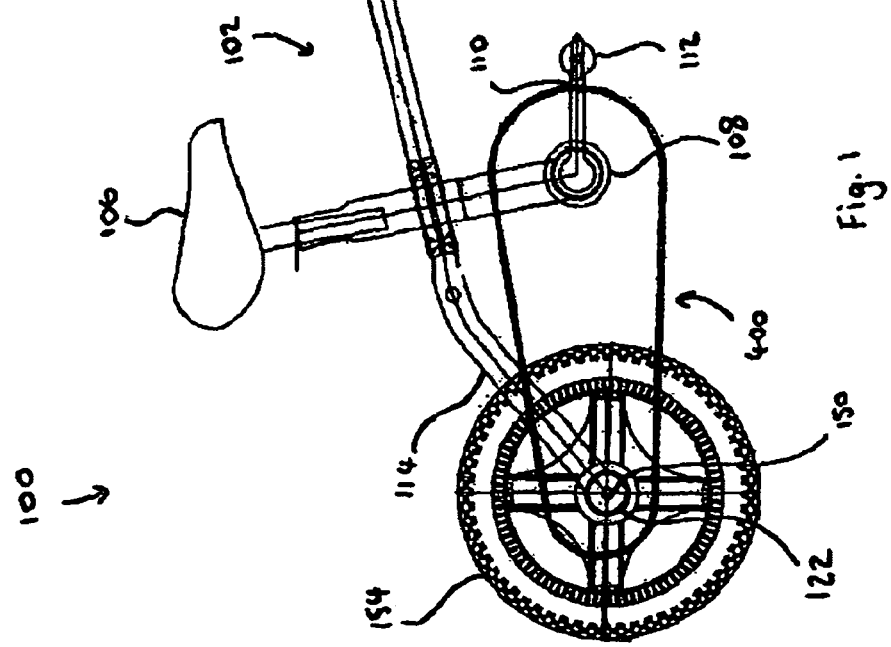

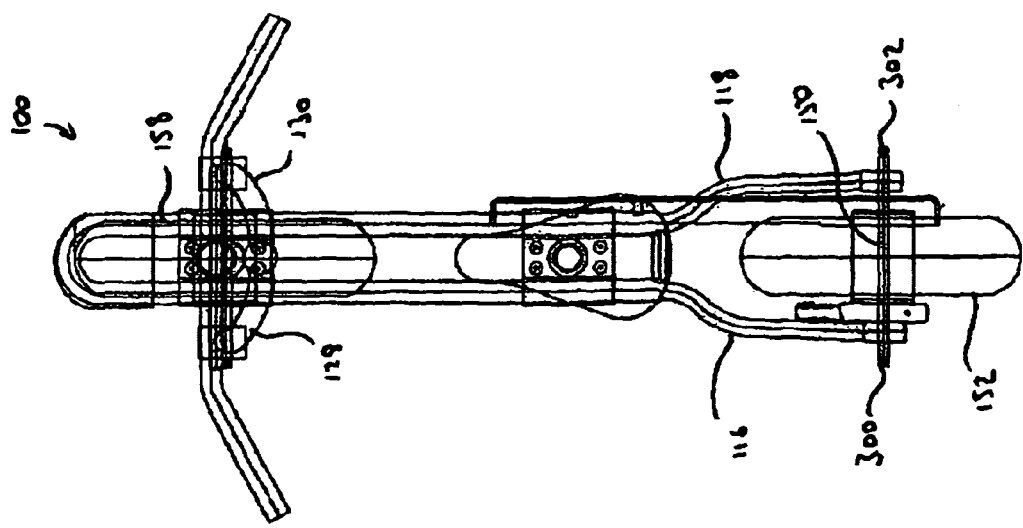
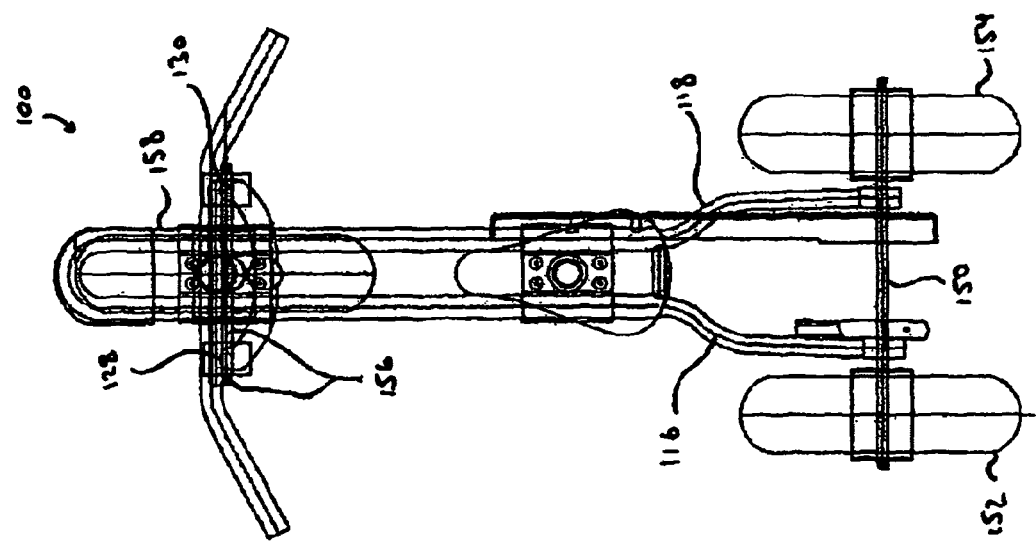
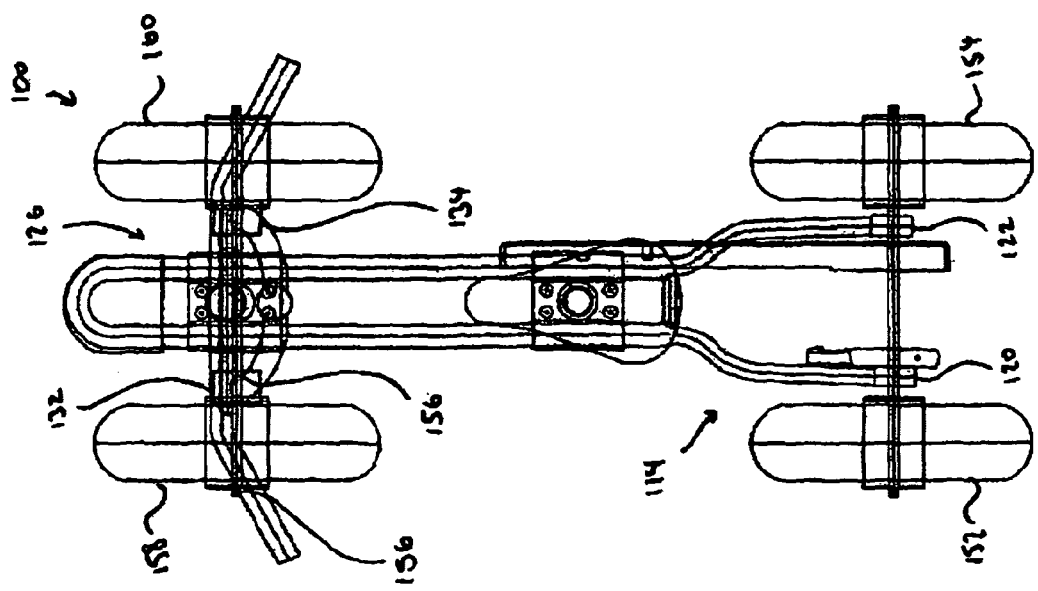

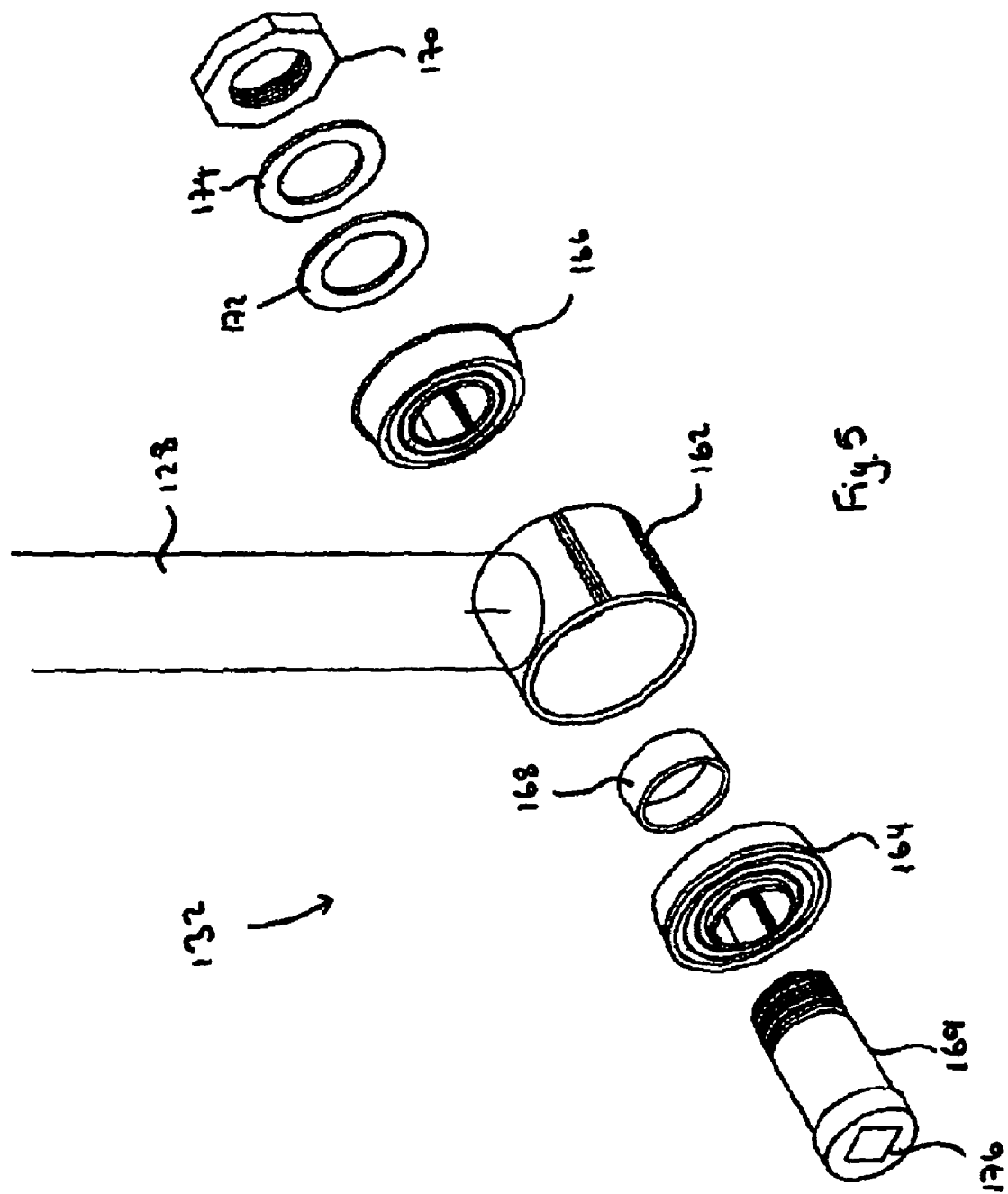

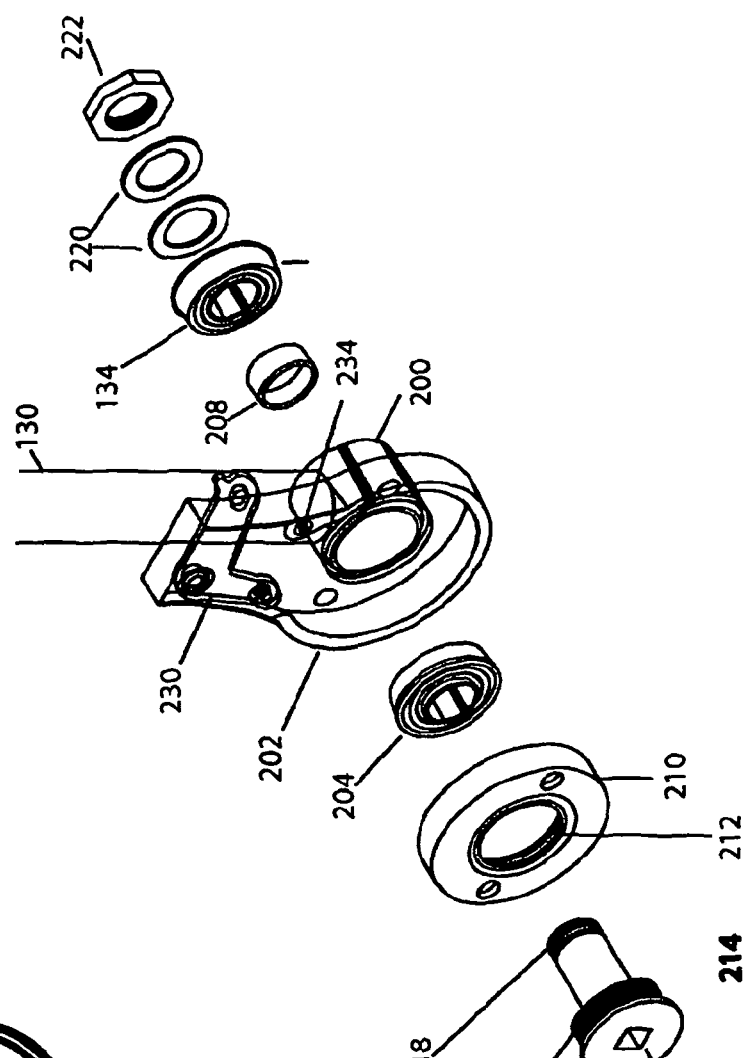
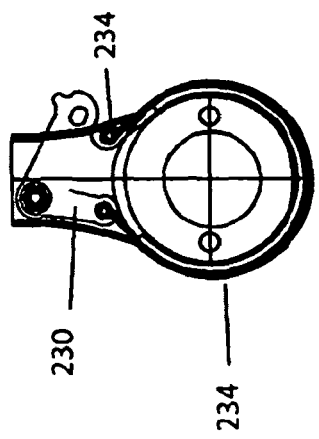
Fig. 6a
Fig. 6b

US 8,382,140 B2

RECONFIGURABLE WHEELED CYCLE

TECHNICAL FIELD

The present invention relates to a wheeled transport device. More specifically, the present invention relates to a cycle for a child.

BACKGROUND

Children of many ages enjoy riding bicycles. The process of learning how to ride a bicycle is often a lengthy one, and the initial stages of the child learning how to balance on a bicycle takes time.

Various solutions have been proposed to address this problem. For example, stabilisers are known which are attached to the sides of the bicycle frame proximate the rear wheel axle. The stabilisers comprise a right-angled triangular frame with a vertical frame member proximate the bicycle frame and a horizontal frame member extending from the bottom end of the vertical frame member away from the bicycle. A stabiliser wheel is mounted at the end of the horizontal frame member.

One of these stabilisers is positioned on each side of the bicycle, thus providing additional stability which the rider can rely on to prevent the bicycle tipping over in use.

A problem with such stabilisers is that they provide three points of contact with the ground at the rear of the bicycle. Therefore unless they are perfectly aligned, the bicycle can either rock about the rear wheel, or the rear wheel (through which drive is provided by the user) is lifted off the ground.

In addition to bicycles, children enjoy riding tricycles. Tricycles are used to provide children with a riding experience at a younger age than bicycles, as the additional stability provided by two axially offset rear wheels means that the child does not need to balance.

SUMMARY

It is an aim of the present invention to provide an improved wheeled transport device. According to the present invention, there is provided a cycle as defined in claims. By "cycle" we mean a vehicle upon which a user sits, which can be a unicycle (one wheel), a bicycle (with two wheels), a tricycle (three wheels) and/or a quad-cycle (four wheels—also known as a quadracycle).

The first fork can comprise a first axle mounting formation, the cycle further comprising a first axle having a first wheel mounted substantially in the axial centre of the first axle, and, a second axle comprising a second wheel axially offset on the second axle, wherein the first and second axles are interchangeable on the first axle mounting formation between the first configuration in which the first wheel is mounted between the first and second fork members to rotate, and the second configuration in which the second wheel is mounted to rotate at a first side of the first fork, on a side of the first fork member opposite to the side facing the second fork member.

The cycle can comprise a third axle comprising a third wheel axially offset on the third axle wherein the third axle is mountable on the first axle mounting formation of the first fork coaxially with the second axle, such that the third wheel is mounted to rotate at a second side of the first fork, on a side of the second fork member opposite to the side facing the first fork member Alternatively the second axle comprises a third wheel axially offset at an opposite side of the second axle to the second wheel, wherein the second axle is mountable on the first axle mounting formation in the second configuration such that the second and third wheels are mounted to rotate with the first fork therebetween. Advantageously, a cycle of this type can be converted from a bicycle into a tricycle and back.

The cycle can comprise the frame comprises a second fork, the second fork having a third and a fourth fork member, which cycle has a third configuration in which a first further wheel is positioned between the third and fourth fork members, and a fourth configuration in which a pair of wheels are positioned either side of the fork with the fork members therebetween, which cycle is convertible between the third state and the fourth state. Advantageously, a cycle of this type can also be converted from a bicycle or tricycle into a quad-cycle.

BRIEF DESCRIPTION OF THE DRAWINGS

An embodiment of a cycle will now be described, by way of example only, with reference to the accompanying drawings in which:

FIG. 1 is a side view of a cycle in accordance with the present invention;

FIG. 2 is a rear view of the cycle of FIG. 1 in a quad-cycle configuration;

FIG. 3a is a top view of the cycle of FIG. 1 in a quad-cycle configuration;

FIG. 3b is a top view of the cycle of FIG. 1 in a tricycle configuration;

FIG. 3c is a top view of the cycle of FIG. 1 in a bicycle configuration;

FIG. 5 is an exploded isometric view of a hub assembly of the cycle of FIG. 1;

FIG. 6a is an exploded isometric view of a further hub assembly of the cycle of FIG. 1;

FIG. 6b is a side view of the hub assembly of the cycle of FIG. 6a; and

DETAILED DESCRIPTION OF THE EMBODIMENTS

Figure 4:
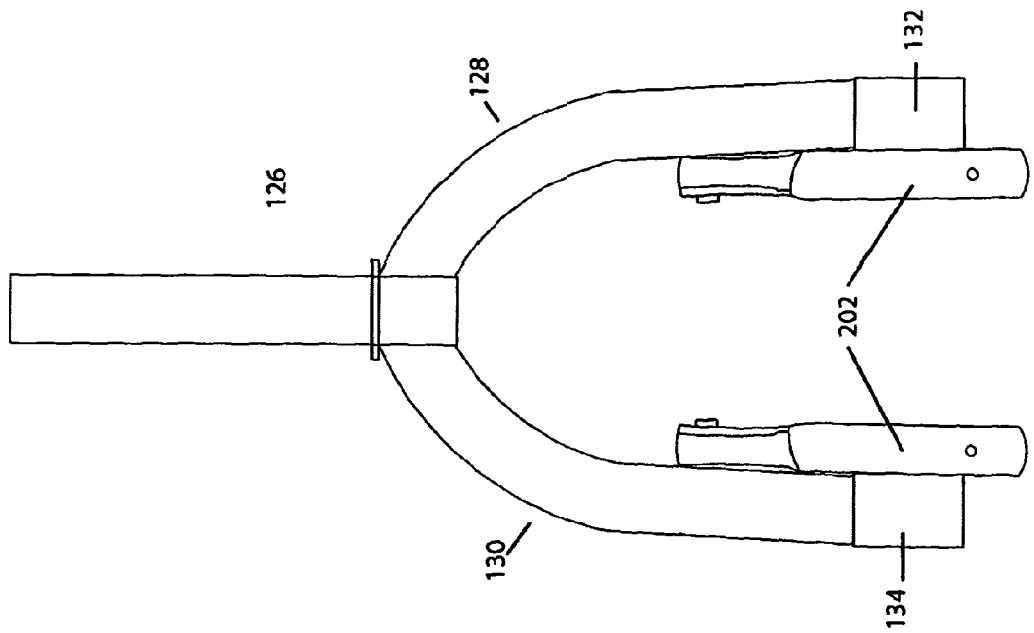
FIG. 4 is a front view of a fork of the cycle of FIG. 1.

Referring to FIG. 1, a cycle 100 comprises a frame 102, with handlebars 104 and a seat 106 extending upwardly therefrom. Proximate the seat 106, the frame 102 extends downwardly to a crank pivot 108 which receives a pedal crank 110 having pedals 112. The rear of the frame 102 extends into a rear fork 114 comprising a first rear fork member 116 and a second fork member 118 (see FIG. 2). The rear fork members 116, 118 are symmetrical and comprise an S bend (or dog leg). The rear fork members 116, 118 diverge outwardly towards the rear of the cycle. Each rear fork member 116, 118 extends towards rear fork hubs 120, 122 at the rear of the frame 102. The rear fork members 116, 118 are substantially parallel either side of the S bend.

The rear fork members 116, 118 are spaced apart by a chosen distance so as to fit a wheel therebetween, but also to provide stability from tipping when two such wheels are mounted to substantially abut the outer sides of the respective fork members 116, 118 and a single wheel is mounted to a front fork (as will be described below).

The handlebars 104 (see FIG. 3) are mounted to the frame 102 to rotate about a handlebar pivot 124. The handlebars 104 extend downwardly to a substantially U-shaped front fork 126 comprising a first front fork member 128 and a second front fork member 130. The front fork members 128, 130 are substantially parallel and arranged to pivot with the handlebars 104. The front fork members 128, 130 each comprise a front fork hub 132, 134 respectively.

The front fork members 128, 130 are spaced apart by a chosen distance so as to fit a wheel therebetween, but also to provide stability from tipping when two such wheels are mounted to substantially abut the outer sides of the respective fork members 128, 130 and a single wheel is mounted to the rear fork 114.

As a tricycle and a quad-cycle the cycle is freestanding with the wheels abutting the front fork 126 and/or rear fork 114 due to the spacing between the relevant fork members.

A rear axle is mounted for rotation between the rear fork hubs 120, 122. The rear axle assembly 150 terminates in a first rear wheel 152 and a second rear wheel 154 either side of the outside of rear fork 114.

Figure 7:
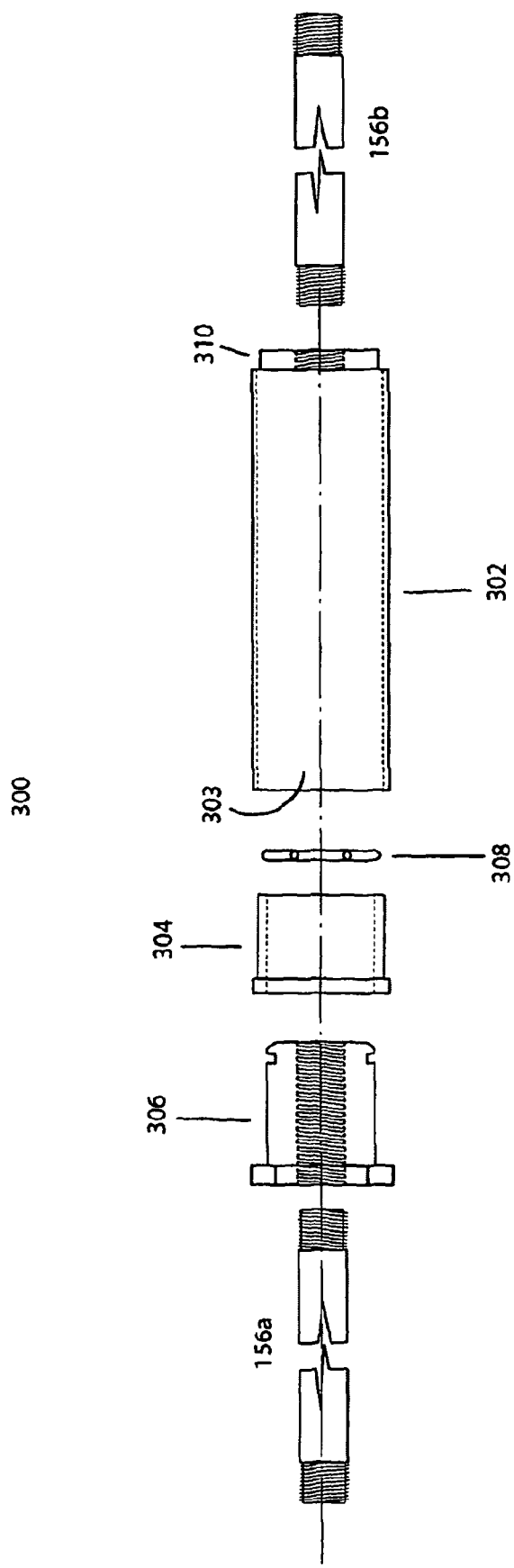
FIG. 7 is a side view for freewheel cassette.

A front axle assembly 156 depicted in FIG. 7 is mounted for rotation between the front fork hubs 134, 132. The front axle 156 (comprising parts 156a, b and c) terminates in a first front wheel 158 and a second front wheel 160 either side of the outside of front fork 126.

In FIGS. 3a to 3c, the cycle 100 is shown in three user-selectable conditions. In the quad-cycle condition shown in FIG. 3a and in FIGS. 1 and 2, the cycle comprises four wheels 152, 154, 158, 160. Each pair of wheels is mounted for rotation outside of the forks 114, 126, preferably abutting an outer part of the forks.

In the tricycle condition shown in FIG. 3b, the cycle comprises three wheels 152, 154, 158. The rear pair of wheels 152, 154 is mounted for rotation outside of the rear fork members 116, 118, and the front wheel 158 is mounted for rotation between the front fork members 128, 130.

In order to transform the cycle from the configuration of FIG. 3a to that of FIG. 3b, the front axle assembly 156 and wheels 158, 160 are first removed. This is achieved by removing a fastening member (not shown) on one end of the axle, sliding one of the wheels 158, 160 off the axle and sliding the axle assembly 156 from the hubs 132, 134. The wheel, either 158 or 160, can then be positioned between the fork hubs 132, 134 as shown in FIG. 3b, and a slightly shorter version of the axle 156 passed through the hubs 132, 134 and the wheel 158 or 160 and fastened at both ends, although it will be noted that the same axle can be used.

In the bicycle condition shown in FIG. 3c, the cycle comprises two wheels 152, 158. The rear wheel 152 is mounted for rotation between the rear fork members 116, 118. The front wheel 158 is mounted for rotation between the front fork members 128, 130.

In order to achieve the configuration of FIG. 3c, the operation for replacement of the front wheels 158, 160 with the front wheel 158 is repeated for replacement of the rear wheels 152, 154.

The wheels 152, 154, 158, 160 can be interchanged to provide the above, and other configurations as desired. It will be understood that this interchangeability of the axles and wheels allows for a low part count (because only the axles and wheels are being replaced, rather than components of the bearing and/or brakes) and fast replacement without the need for any complex setup procedures involving the wheel bearings and/or brakes The rear fork 118 comprises hub 122 and is described with reference to FIG. 5. The hub 122 comprises a cylindrical hub housing 162 welded to the rear fork member 118. Two bearing elements 164, 166 are inserted into the housing 162 from either side thereof. A spacer 168 sits between the bearing elements 164, 166. A bolt 169 is inserted through the bearing elements 164, 166 and the assembly secured together with a nut 170 screwed over the bolt 169 with a pair of washers 172, 174 therebetween. The bolt 169 is generally solid but has a square aperture 176 defined therethrough.

When assembled, the bolt 169 can freely rotate within the bearing elements 166, 164 relative to the housing 162.

The axles 150, 151 are square in cross section, being a close fit inside the aperture 176 of the bolt 169. Due to their non-circular shape, the axles 150, 151 are rotationally fixed relative to the bolt 169 but thereby rotatable with respect to the fork member 118. This arrangement negates the need to carry bearings on removable axles. The hubs 120, 132, 134 are substantially identical and will be described with reference to FIGS. 6a and 6b. The front fork 126 comprises hubs 132, 134 (as shown in FIG. 4). The rear fork 116 comprises hub 120 (as shown in FIG. 3).

Referring to FIG. 6a, the hubs 132, 134 comprise a cylindrical hub housing 200 welded to the front housing members 128,130. A brake housing 200 is also attached to the rear fork member 116. Two bearing elements 204, 206 are inserted into the housing 200 from either side thereof. A spacer 208 sits between the bearing elements 204, 206. In this respect, the hubs 120, 132, 134 are similar to the hub 122 above.

In addition, a brake disc 210 is aligned coaxially with the bearing elements 204, 206. The brake disc 210 comprises an internal thread 212. A bolt 214 comprises an enlarged externally threaded head 216, and a partially threaded shaft 218. The bolt 214 is screwed into the brake disc 210 via engaging threads 212, 216. The bolt shaft 218 is then passed through the bearing members 204, 206 and secured with washers 220 and a nut 222. As such, the assembly of the bolt 214, disc 210, washers 220 and thread 218 engage with nut 222 can rotate freely relative to the housing 200.

As with the bolt 169, the bolt 214 is generally solid but has a square aperture 224 defined therethrough through which a square axle can pass.

The brake housing 202 has a lever 230 mounted therein, one end of which is attached to a brake band 232 (FIG. 6b) which circumnavigates the disc 210 and is attached to the housing 202 at a pin 234 (FIGS. 6a and 6b). A clamping force can therefore be applied to the disc 210 by rotating the lever anti-clockwise as shown in FIG. 6b. Such rotation may be imparted, for example, by a bowden cable attached to the lever 230.

The hubs 120, 132 and 134 can therefore be used to brake the cycle 100 using known braking levers. It will be appreciated that the hubs 120, 132 and 134 perform the braking function, and are positioned on opposite sides of the cycle in order to provide an equal braking effect.

In order to assemble the cycle 100, the axle 150 is threaded through the first rear hub 120, through the wheel 152 and through the second rear hub 122. The axle can then be secured via bolts threaded onto appropriately formed cylindrical threaded ends 300, 302 (see FIG. 3c). This process is substantially identical if a single wheel is installed between the front forks 126.

If two wheels are desired at the rear, a longer rear axle 151 (see FIG. 3b) is used, and is threaded through the first rear wheel 152, the first rear hub 120, the second rear hub 122 and finally the second rear wheel 154.

It will be appreciated that each wheel 152, 154, 158, 160 defines a square aperture through which the axles 150, 151, 156a and 156b are received. The wheels 152, 154, 158, 160 are therefore rotationally fixed with respect to the axles 150, 151, 156a and 156b.

This can cause a problem when two wheels 158, 160 are selected at the front (per FIG. 3a). When the cycle is travelling, and the rider wishes to steer the cycle, by doing so the wheels will naturally need to move at different rotational speeds. If the wheels 158, 160 are fixed in rotation, they will not do so, rather one wheel will tend to skid or "scrub" over the ground which makes steering harder and wears the tyres.

In order to overcome this problem, two half-axles 156a, 156b, with opposing handed threads, linked by a freewheel cassette 300 (as described in FIG. 7) are utilized when cycle is used in the FIG. 3a configuration. The two axles are able to move at different speeds and therefore this problem is alleviated.

Cassette 300 comprises an outer sleeve 302 with threaded washer 310 attached to the end which faces away from the wheel 158 and circular aperture 303 which faces the wheel 160. The aperture 303 is designed to receive the freewheel bearing comprising of a threaded housing 306 and rotating sleeve 304 which is secured by circlip 308.

In use the axles 156a, 156b are fitted through bearings 132, 134 (FIG. 4) and attached to the threaded ends of cassette 300. This permits different rotational speeds for the wheels 158, 160. A higher friction bearing, can be used as the rotation speed of the bearing will be low, and the duty cycle will be far lower than the main bearings 204, 206 as the plain bearing will only be used when cornering. Any type of differential could be used as an alternative.

The cycle 100 is also provided with a standard chain drive 400, which links the pedal crank 110 and the rear axle 150. The hub 122 has a driven gear rotatably mounted thereto (not shown) which also comprises a square aperture to receive the axle 150. Variations of the above embodiments are possible. For example, in a variation falling outside the scope of the claims, the cycle may have a standard front wheel arrangement permitting configuration as a bicycle and tricycle only. In another variation the rear axle 150 may also comprise a differential.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A cycle having a frame comprising:
a front fork, the front fork having a first fork member and a second fork member;
a rear fork, the rear fork having a third fork member and fourth fork member;
wherein the cycle has a first configuration in which a first wheel is positioned between the first fork member and the second fork member and a second wheel is positioned between the third fork member and the fourth fork member; a second configuration in which the first wheel is positioned between the first fork member and the second fork member and a first pair of wheels is positioned on either side of the third fork member and the fourth fork member with the third fork member and the fourth fork member located between the first pair of wheels; and a third configuration in which a second pair of wheels is positioned on either side of each of the first and second fork members with the first fork member and the second fork member located between the second pair of wheels and the first pair of wheels is positioned on either side of each of the third and fourth fork members with the third fork member and the fourth fork member located between the first pair of wheels, wherein the cycle is configured to convert between the first configuration, the second configuration and the third configuration to form a bicycle, a tricycle or a quadcycle.

2. The cycle according to claim 1 wherein the front fork comprises an axle mounting formation, the cycle further comprising:
a first axle configured to have the first wheel mounted substantially in an axial center of the first axle; and
a second axle configured to have the second pair of wheels axially offset on the second axle, wherein the first and second axles are interchangeable on the axle mounting formation to change between the first or second configuration in which the first wheel is mounted on the first axle between the first and second fork members to rotate, and the third configuration in which the second pair of wheels is mounted on the second axis to rotate.

3. The cycle according to claim 2 wherein the second axle comprises a first wheel portion and a second wheel portion, wherein the first wheel portion is mounted at a first side of the first fork, on a side of the first fork member opposite to a side facing the second fork member and the second wheel portion is mounted to rotate at a second side of the first fork, on a side of the second fork member opposite to the side facing the first fork member.

4. The cycle according claim 2 wherein the first, second, third and fourth fork members each comprise a bearing element, the bearing element having a first part fixed to the fork member and a second part rotatable with respect to the first part via a bearing, the second part formed to interchangeably receive the first and second axles.

5. The cycle according to claim 4 wherein the first and second axles each define a non-circular cross section portion, and the second part is formed to receive the non-circular cross section portion such that the axle and the second part are rotationally fixed together.

6. The cycle according to claim 5 wherein the first and second axles are square in cross section for at least a part of an axial length.

7. The cycle according claim 4 wherein the first fork member comprises a brake mechanism, the brake mechanism having a brake mount fixed to the first fork member and a brake member rotatable with respect to the brake mount, the second part formed to interchangeably receive the first and second axles, in which the brake mechanism is actuable to provide a braking force between the brake mount and the brake member.

8. The cycle according to claim 7 wherein the brake mechanism is a band brake.

9. The cycle according claim 2 wherein the second axle is longer than the first axle and about double its length.

* * * * *